July 9, 1940. B. R. GRANBERG ET AL 2,206,886
MACHINE TOOL
Filed Sept. 6, 1938 3 Sheets-Sheet 1
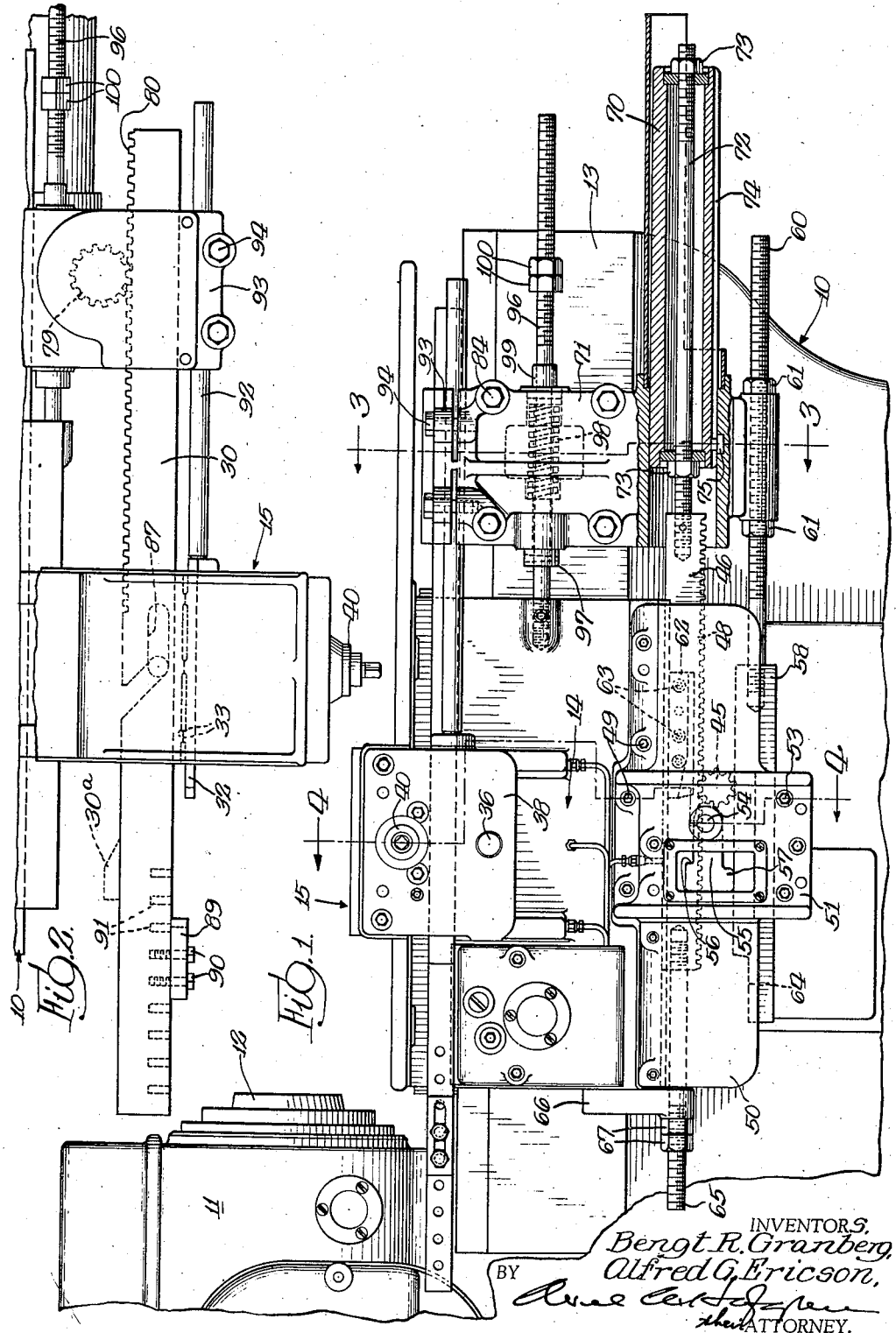
INVENTORS.
Bengt R. Granberg,
Alfred G. Ericson,
BY
their ATTORNEY.

July 9, 1940.  B. R. GRANBERG ET AL  2,206,886
MACHINE TOOL
Filed Sept. 6, 1938   3 Sheets-Sheet 2
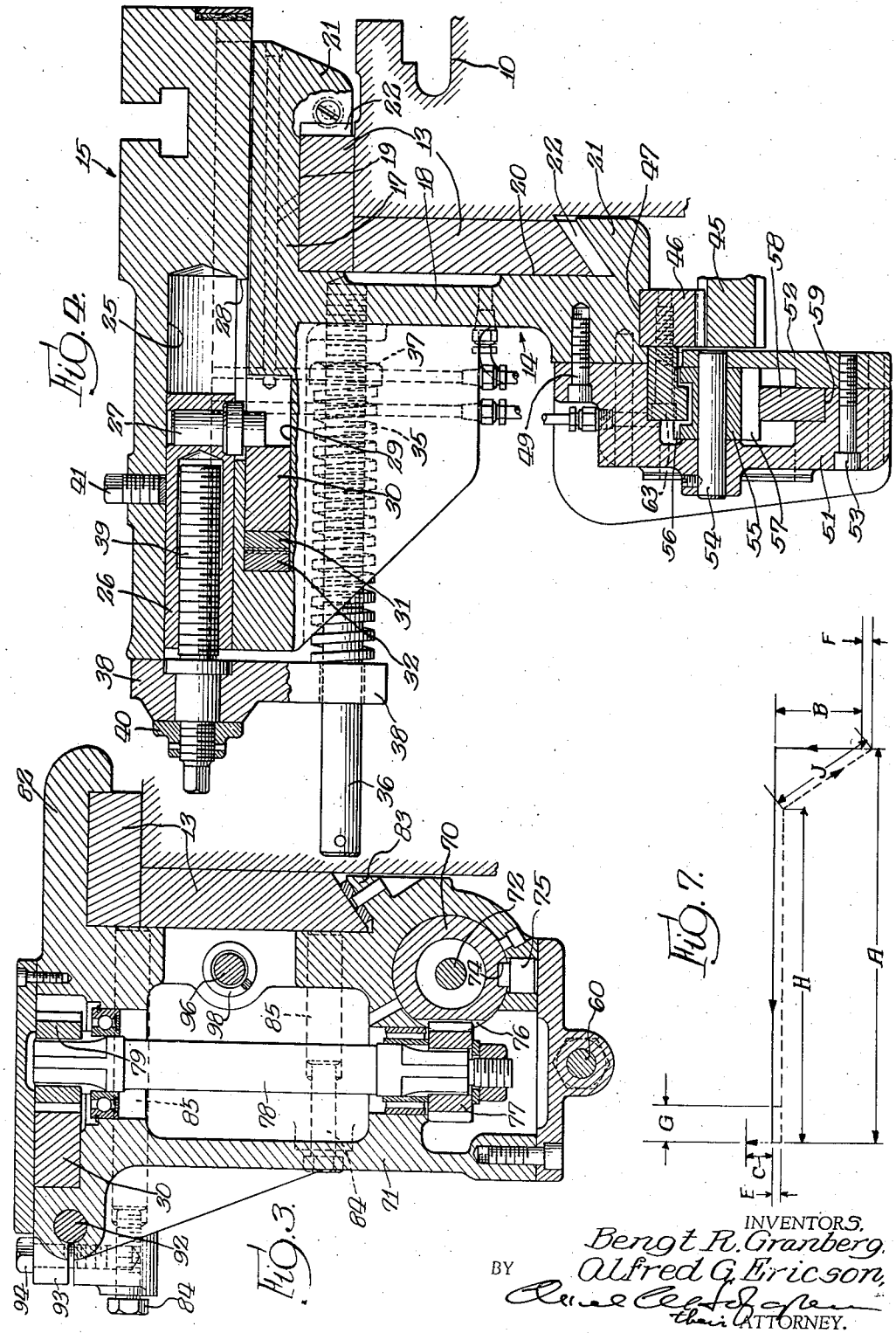
INVENTORS.
Bengt R. Granberg,
Alfred G. Ericson,
BY
their ATTORNEY.

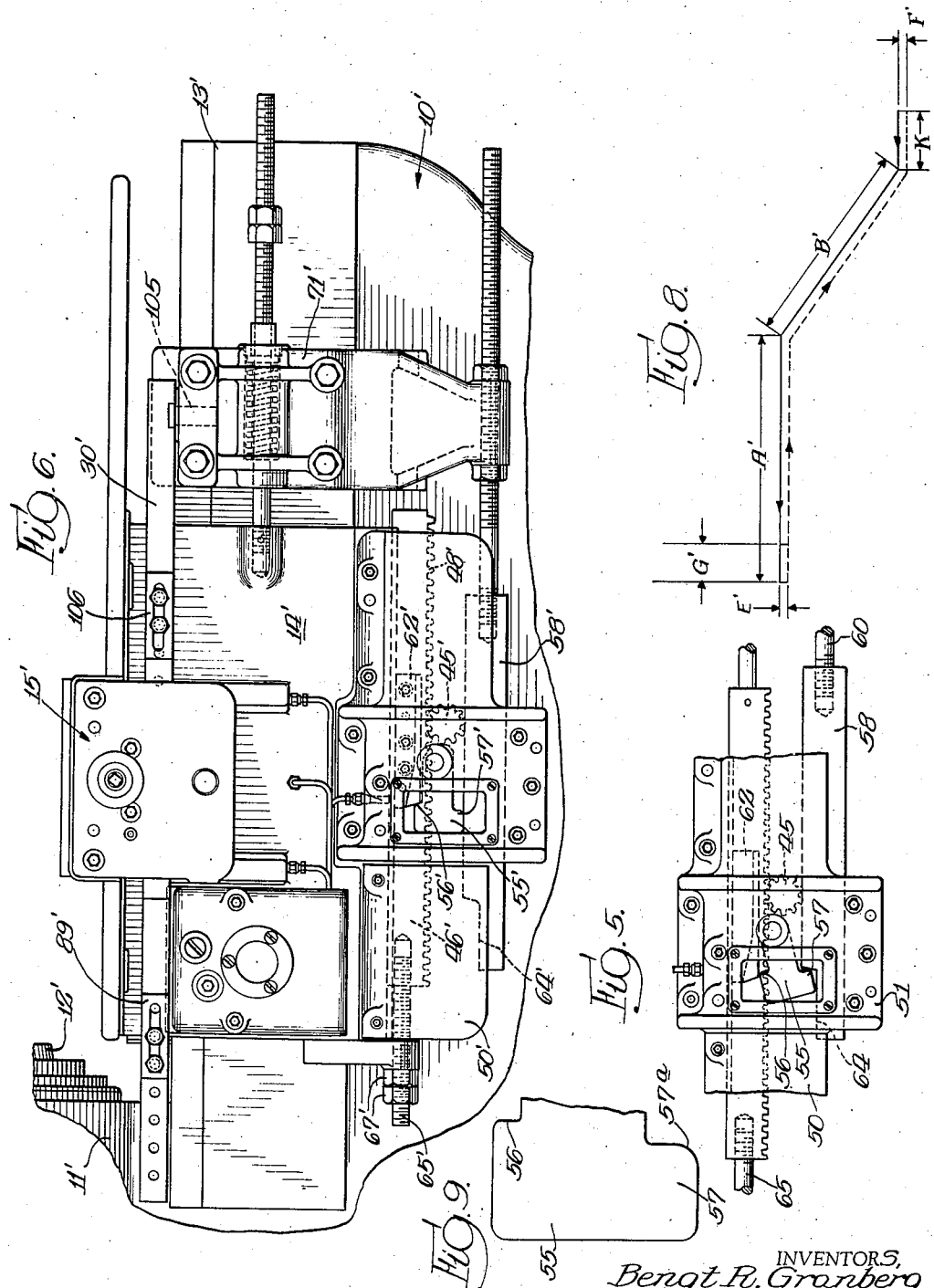

Patented July 9, 1940

2,206,886

UNITED STATES PATENT OFFICE 2,206,886

MACHINE TOOL

Bengt R. Granberg and Alfred G. Ericson, Rockford, Ill., assignors to Sundstrand Machine Tool Co., Rockford, Ill., a corporation of Illinois Application September 6, 1938, Serial No. 228,522

18 Claims. (Cl. 82—21)

The invention relates generally to a machine tool and more particularly to a feed mechanism for the carriage and cross slide of a machine tool.

A general object of the invention is to provide a new and improved feed mechanism for the carriage and cross slide of a machine tool capable of producing different and improved movements of the carriage and the cross slide.

A more particular object of the invention is to perfect a new and improved feed mechanism for the carriage and cross slide of a machine tool in which the cross slide may be moved independently of the carriage.

Another object is to provide in a machine tool, having a carriage, a cross slide and power means for driving the same, a feed mechanism for the carriage and the cross slide including a feed bar driven from the power means and having an independent driving connection with each the carriage and the cross slide.

Yet another object is to provide in a machine tool, having a carriage, a cross slide and power means for driving the same, a feed mechanism having an independent driving connection with each the carriage and the cross slide, and adjustable means for said connections for variously correlating the actuation of the carriage and cross slide to obtain different cycles of movement thereof.

A further object is to provide in a machine tool, having a carriage, a feed mechanism for the carriage including a driving member and a disengageable connecting means of new and improved construction permitting movement of the driving member relative to the carriage and a slowing down of the carriage before it stops.

Other objects and advantages will become apparent from the following detailed description taken in connection with the accompanying drawings, in which:

Fig. 1 is a fragmentary view of a machine tool, partially in elevation and partially in section, disclosing a feed mechanism embodying the features of the invention.

Fig. 2 is a fragmentary plan view of the feed mechanism disclosed in Fig. 1.

Fig. 3 is a sectional view taken approximately along the line 3—3 of Fig. 1.

Fig. 4 is a sectional view taken approximately along the line 4—4 of Fig. 1 but showing the cross slide in its feed-in position rather than the withdrawn position shown in Fig. 1.

Fig. 5 is a fragmentary view showing the drive mechanism for the carriage in disengaged position.

Fig. 6 is a view generally similar to Fig. 1 showing a modified form of the invention.

Fig. 7 is a diagrammatic view illustrating a cycle of movement which may be obtained by the feed mechanism forming the preferred embodiment of the invention.

Fig. 8 is a diagrammatic view illustrating a cycle of movement which may be obtained from the feed mechanism disclosed in the modified form of the invention.

Fig. 9 is a fragmentary view of a part of the feed mechanism.

While the invention is susceptible of various modifications and alternative constructions, it is shown in the drawings and will be described hereinafter in a preferred embodiment and one modification, but it is not intended that the invention is to be limited thereby to the specific embodiments disclosed, but it is intended to cover all modifications and alternative constructions falling within the spirit and scope of the appended claims.

For purposes of disclosure, the invention is here shown embodied in a lathe such as that disclosed in the copending application of Bengt Granberg and John B. Sinderson, Serial No. 66,463, filed February 29, 1936. Such a lathe comprises generally a bed 10, at one end of which is a headstock 11 in which is rotatably supported a spindle 12. Formed on or secured to the side of the bed 10 is a horizontal guideway 13 and slidably mounted on the guideway for movement longitudinally of the lathe is a carriage 14 carrying a cross slide 15. Suitable power means are, of course, provided for driving the spindle 12 and the carriage 14 and the cross slide 15, and it is a feature of this invention to provide new and improved feeding mechanism between the power means and the carriage and the cross slide whereby new and different cycles and improved operation of the machine tool may be obtained.

Considering briefly first the construction of the carriage 14 and the construction of the cross slide 15, which constructions per se form no part of the invention but have been disclosed and claimed in prior patents, the carriage 14 comprises a horizontal portion 17 and a depending portion 18 providing horizontal and vertical surfaces 19 and 20 for sliding engagement on the way 13. In conventional manner the carriage is formed with overhanging portions 21 between which and corresponding surfaces on the guideway suitable gibs 22 are interposed to provide for the proper adjustment of the carriage on the way and the taking up of wear and play between the carriage and the way.

The horizontal portion 17 of the carriage is formed with guideways extending transversely of the carriage and of the lathe, and slidably supported on the carriage 14 and guided by the ways for movement transversely of the carriage is the cross slide 15. This slide is formed with a longitudinally extending bore 25 opening through the front end of the slide and in which is received slidably a piston 26. At its inner end, the piston 26 carries a pin 27 in the nature of a cam follower which projects through a slot 28 into a longitudinally extending recess 29 formed in the horizontal portion 17 of the carriage. Disposed in the recess 29 is a cam bar 30 with which the cam follower 27 cooperates. Also disposed in the recess 29 is a bar 31 fixed to the carriage 14 and a cooperating bar 32 disposed for limited sliding movement relative both to the bar 31 and the carriage. These bars 31 and 32 each have opposed teeth 33 (see Fig. 2) which in the normal position of the bar 32 are in registry so as to separate the bars, and in the shifted position of the bar 32 are out of registry so as to reduce the spacing between the bars. There is thus formed a tool relief mechanism which is more particularly described and claimed in the patent to Timothy B. Buell No. 2,002,933, issued May 28, 1935. The follower 27 is retained in contact with the cam bar 20 by means of a compression spring 35 which encircles and is supported on a rod 36, extending from the carriage 14, and which bears at one end against a nut 37 on the rod and at the other end bears against a depending portion of a plate 38 secured to the end of the cross slide 15. Rotatable in the plate 38 but held against axial movement relative thereto is a micrometer screw 39 threaded into the piston 26. The projecting end of the micrometer screw is formed to receive a tool and carries a dial 40 to facilitate accurate adjustment of the cross slide transversely of the carriage by rotation of the screw 39. Once adjusted the piston 26 preferably is retained in adjusted position by means of a set screw 41.

Having described the construction of the carriage and the cross slide, the improved feeding mechanism therefor will now be considered. In the preferred form of the invention, this feeding mechanism comprises generally a common feed member having independent operating connections with the carriage and with the cross slide whereby the carriage and the cross slide may be actuated independently one of the other and wherein such actuation may be varied to obtain a variety of different cycles of movement of the carriage and the cross slide. As previously stated, the lathe includes a power means for driving the spindle 12 and the carriage 14 and the cross slide 15. In the present instance, the portion of the power means for driving the carriage and the cross slide terminates in a pinion 45, reference being made for a more complete description of the power means to the above mentioned application of Granberg and Sinderson in which the power means is completely disclosed and claimed. Suffice it to say, therefore, that the pinion 45 may be driven in a forward or reverse direction, that is, counterclockwise or clockwise, respectively, as viewed in Fig. 1, and at a feed or traverse rate.

In the present instance, the common feed member of the feeding mechanism takes the form of a bar 46 slidably guided for longitudinal movement in a groove 47 in the bottom of the carriage 14 and having rack teeth 48 formed on one edge thereof for engagement with the pinion 45 to be driven therefrom. The bar 46 in turn, through means carried thereby or secured thereto and forming parts of the driving or operating connections with the carriage and with the cross slide, actuates the carriage and the cross slide one independently of the other.

The operating or driving connection from the feed bar to the carriage, which will first be considered, is of disengageable type permitting relative movement between the feed bar 46 and the carriage in which it is guided. To provide a support or a guide for certain elements of the operating connection, the carriage 14 has removably secured, as by bolts 49, near the bottom of its vertical portion 18, an elongated apron 50 which as intermediate its ends a somewhat enlarged and reinforced portion 51 including a back plate 52 secured to the apron by means of bolts 53. Pivotally mounted on a pin 54, extending transversely of the apron at the enlarged portion so as to be journaled in the apron and the back plate 52, is a dog 55 having an enlarged head extending transversely of the dog to provide on its upper surface a shoulder 56, and forming on the lower surface a protruding lip 57. This dog is retained in its normal or operative position, shown in Fig. 1, by means of a guide bar 58 which is slidably supported in a groove 59 formed in the enlarged portion 51 of the apron 50 between the apron and the back plate 52. The guide bar 58 is stationarily but adjustably mounted with respect to the bed 10 and to that end has secured thereto a threaded rod 60 adjustably secured in a fixed portion of the machine tool by means of nuts 61. When in normal or operative position, the shoulder 56 of the dog 55 is disposed in the path of a cam block 62 secured to the side of the feed bar 46 as by bolts 63. Thus as the feed bar 46 is actuated in a forward direction, the cam block 62, after a predetermined movement of the bar 46 determined by the adjustment of the cam block, engages the shoulder 56 of the dog 55 and through the dog drives the carriage 14 through a forward or approach movement. During such drive of the carriage, lip 57 of the dog 55 slides along the guide bar 58 and thus is retained in the path of the cam block 62.

In order that the carriage 14 may again remain stationary after a predetermined movement, while the feed bar 46 continues to be advanced, the guide bar 58 is provided with a reduced portion 64 into which the lip 57 of the head of the dog 55 may drop and thus permit the dog to pivot to the position shown in Fig. 5 and withdraw its shoulder 56 from the path of the cam block 62. To assure that the dog will pivot upon reaching the reduced portion 64, both the shoulder 56 and the end of the cam block 63 are given a slight bevel, such that the continued engagement of the end of the cam block with the shoulder 56 will tend to cam the dog 55 out of the path of the cam block. Similarly, the shoulder formed by the lip 57 is given a slight bevel in order that the dog may again be cammed into its normal or operative position upon the return movement of the carriage. Such return movement of the carriage is in the present instance effected directly by the feed bar 46. To that end the forward end of the feed bar has threaded thereinto a rod 65 extending forwardly therefrom to a point beyond the forward edge of the carriage. The rod 65 extends slidably through a bracket 66 on the carriage which thus acts as a support and guide for the forward end of the feed bar 46, and carried adjustably on the free end of the rod 65 are a pair of nuts 67 which serve to limit the withdrawal movement of the rod 65 and thus operate to effect the return movement of the carriage 14.

Having described the operative connection between the feed bar 46 and the carriage 14, the connection between the feed bar and the cross slide 15 will now be described. Such a connection includes a cylinder 70 which is slidably mounted in a stationary bracket 71 fixed on the bed of the lathe. The cylinder 70 is adjustably secured to the end of the feed bar 46 by means of a rod 72 threaded into the end of the bar 46 and extending axially through the cylinder 70. To obtain adjustment of the cylinder relative to the bar 46, the cylinder is secured on the rod 72 between nuts 73 threaded onto the rod and engages the ends of the cylinder 70 so that by adjustment of the nuts longitudinally of the rod the position of the cylinder with respect to the bar 46 may be changed. The cylinder 70 is preferably provided with a keyway 74 in which a key 75 is slidably received to retain the cylinder against rotation while permitting reciprocation thereof relative to the bracket 71.

On one side, the cylinder 70 is formed with rack teeth 76 which mesh with a pinion 77 splined to the lower end of a short shaft 78 rotatably supported in vertical position in the bracket 71. At its upper end the shaft 78 has splined thereto a second pinion 79 which meshes with rack teeth 80 formed on one edge of the cam bar 30 which is engaged by the follower 27 to actuate the cross slide 15. It is believed apparent that through the cylinder 70 and the pinions 77 and 79 the cam bar 30 is reciprocated directly from the feed bar 46 as an incident to movement thereof. For purposes of a more ready understanding of the operation of the machine tool, as well as the purpose of certain stops, it is here pointed out that as the feed bar 46 is moved forwardly the cam bar 30 is moved rearwardly, and conversely as the feed bar is moved rearwardly the cam bar 30 is moved forwardly.

In order to secure the bracket 71 fixedly on the bed 10, the bracket is formed with a rearwardly extending portion 82 adapted to hook over the upper portion of the way 13 and with a rearwardly extending, inclined portion 83 adapted to engage the inclined surface of the way 13. The bracket is rigidly clamped to the way 13 by means of bolts 84 which are threaded into the bracket and at their inner ends abut plungers 85 slidably mounted in the bracket and extending through the rear face thereof for engagement with the way 13. Upon tightening of the bolts 84, these plungers 85 are forced against the way 13 and thus fixedly clamp the bracket onto the way.

In the present instance, the cam bar 30 is shown as having a cam slot 87 having a portion extending longitudinally of the cam bar 30 and a portion extending obliquely of the cam bar in which the follower 27 is received. It is believed apparent that as the cam bar 30 is reciprocated the slide 15 will be given a particular movement depending upon the shape of the cam slot 87, and it is to be understood that while a particular shape of slot is shown herein for purposes of disclosure it is not to be understood that that is the only slot which may be employed, but on the contrary it is to be understood that the particular slot is exemplary only and that, of course, a cam slot having different configurations designed to produce a specified movement of the cross slide may be employed.

In addition to actuating the cross slide 15, the cam bar 30 also actuates the tool relief mechanism at the end of the cutting operation, and to that end carries a dog 89 adjustably secured to the bar 30 by means of bolts 90 adapted to be received in various recesses 91 formed in the cam bar for that purpose. The dog 89 is positioned to abut and shift the bar 32 after completion of the cutting operation so as to move the teeth 33 of the bars 31 and 32 out of registry and thus effect relief of the tool. Sufficient play is provided between the cam bar 30 and the bracket 71 to permit of the extremely slight pivotal movement of the bar required to effect relief of the tool. To reset the tool relief mechanism at the end of the return stroke of the carriage 14, a stop 92 is provided which is positioned to abut the opposite end of the bar 32 for the purpose of returning the same to its original position in which the teeth 33 are again in registry and the cross slide 15 fed in to normal nonrelief position. The stop 92 is adjustably retained in fixed position in the bracket 71, which for that purpose is provided with a split clamp 93 which may be drawn together by bolts 94 for fixedly securing the stop 92.

Movement of the carriage 14 in a forward direction is also preferably limited. To that end the carriage 14 has threaded thereinto and extending rearwardly therefrom a rod 96, which rod also extends slidably through the bracket 71. Pinned to the rod 96 adjacent the carriage 14 is a collar 97 which serves to limit the minimum distances between the carriage and the bracket 71 when the machine tool is being set up. Surrounding the rod 96 within the bracket 71 is a compression spring 98 which at one end abuts against the bottom of a socket formed in the bracket and at the other end abuts a sleeve 99 slidable on the rod 96. Outwardly of the sleeve 99, the rod has adjustably threaded thereon a pair of nuts 100 which are normally adjusted to engage the sleeve 99 at the end of the forward or approach movement of the carriage 14. As will presently become more apparent, the primary purpose of the stop means for the carriage 14 is to prevent continued forward movement of the carriage by the frictional engagement between the cam bar 30 and the cross slide 15 at the time of reversal of the feed mechanism since at that time, as previously described, the cam bar 30 will be given a forward movement and thus might tend to give the carriage 14 an additional and sudden forward movement.

Referring now more particularly to the modified form of the invention shown in Fig. 6, as disclosed therein the feed mechanism takes a form which is somewhat simplified over that disclosed in the preferred embodiment of the invention previously described. The modified form of the invention is again disclosed in conjunction with a lathe, the same as that shown in Figs. 1 to 5, which accordingly comprises a bed 10′, a headstock 11′ in which a spindle 12′ is rotatably mounted, and a horizontal way 13′ formed on or secured to the bed 10′. Slidably mounted on the way 13′ for reciprocation longitudinally of the lathe is a carriage 14′, and in turn slidably mounted on the carriage for reciprocation transversely thereof and of the lathe is a cross slide 15'. The lathe has embodied therein, but not shown, a power means terminating in a pinion 45' capable of rotation in forward and reverse direction and at a feed and traverse rate, all as previously more fully described in connection with the preferred form of the invention.

Though simplified over the mechanism of the preferred form of the invention, the feeding mechanism in the modified form still comprises a feed bar 46' which has formed on one edge thereof rack teeth 48' for meshing with the pinion 45' and which is guided for sliding movement in the lower edge of the carriage 14'. The operative or driving connection between the feed bar 46' and the carriage 14' is identical with that disclosed in the preferred form of the invention and thus comprises a dog 55' pivotally mounted in an apron 50' secured near the bottom of the carriage 14'. The dog 55' has a head forming a shoulder 56' on the upper edge of the dog and a projecting lip 57' on the lower edge which is adapted to ride along the upper edge of a stationary guide bar 58' adapted to support the dog 55' in normal position in which its shoulder 56' is disposed in the path of a cam block 62' secured on the feed bar 46'. Guide bar 58' has a reduced portion 64' which permits the dog 55' to pivot out of the path of the cam block 62' for disengaging the carriage from the feed bar 46'. Return of the carriage is effected through the medium of a rod 65' threaded into the forward end of the feed bar 46' and carrying adjustable nuts 67' which, upon the return movement of the bar 46', abut the carriage 14' to effect return thereof with the bar.

While the cam block 62' may be so adjusted with respect to the dog 55' that there will be some forward movement of the feed bar 46' prior to a corresponding movement of the carriage 14', such movement of the feed bar, because of the simplified construction of the drive for the cross slide as will presently become apparent, normally is not essential and thus the cam block 52' is positioned as shown in Fig. 6 so as to be in engagement with the dog 55' when both the bar 46' and the carriage 14' are at the beginning of their respective approach movements. Such adjustment of the cam block 62', however, does not prevent the carriage 14' from being disengaged from the bar 47' when the dog reaches the reduced portion 64 of the guide bar 58'.

While the feed mechanism for the carriage 14' was the same as that of the preferred form of the invention, the feed mechanism for the cross slide is simplified and does not have a direct driving connection with the feed bar 46'. In the modified form, the cam bar 30' for the cross slide 15' is not reciprocably mounted to be driven from the feed bar 46', but is fixedly mounted and transverse movement is imparted to the cross slide 15' only as an incident to movement of the cross slide longitudinaly of the cam bar 30' because of corresponding longitudinal movement of the carriage 14'. Accordingly, the cam bar 30' is stationarily mounted at its rear end in a bracket 71' secured in fixed position on the way 13' in the manner previously described. Preferably, the cam bar 30' is mounted on a pin 105 so as to permit of the slight pivotal movement necessary to accommodate the tool relief mechanism incorporated in the cross slide. The tool relief mechanism which is identical with that previously described in the preferred form of the invention is shifted to effect relief of the tool at the end of the cutting stroke by a dog 89' carried on the cam bar 30' and is reset at the end of the return stroke by a dog 106 adjustably secured to the cam bar 30' which takes the place of the stop 92 of the preferred form of the invention.

In order that the features, advantages and operation of the invention may be better understood, a cycle of operation for each the preferred and the modified form of the invention will now be described. Considering first the cycle for the preferred form of the invention, the tool movement resulting from such a cycle is disclosed in the diagram shown in Fig. 7, and is exemplary of many cycles that may be attained with a standard cam bar 30 of the type shown in Fig. 2. Let it be assumed that the carriage 14, the cross slide 15, and the feeding mechanism are in their normal position just prior to initiation of a working and return cycle. Under those conditions, the carriage, cross slide, and feeding mechanism will be in the positions shown in Figs. 1, 2 and 3 and the pinion 45 will just have been reversed and will now be driven in a counterclockwise direction, as viewed in Fig. 1.

As a result of such rotation of the pinion 45 in a counterclockwise direction, the feed bar 46 will be actuated in a forward direction, that is, to the left as viewed in Fig. 1. Such actuation of the feed bar 46, however, will not result in movement of the carriage 14 for the latter is disengaged from the feed bar 46 and will remain stationary a predetermined length of time. Such forward movement of the feed bar 46, however, through the cylinder 70 and pinions 77 and 79 is imparted to the cam bar 30 which is, however, actuated in an opposite direction, namely, to the right as viewed in Figs. 1 and 2. Since the cam follower 27 of the cross slide 15 is in the oblique portion of the cam slot 87, such movement of the cam bar 30 will cause the cross slide to be moved transversely of the carriage and the lathe, and consequently will cause the tool carried by the cross slide to be fed in to depth before any movement longitudinally of the lathe is imparted to the tool. Such feed of the tool in to depth is represented by the portion B of the diagram of Fig. 7.

After the feeding-in of the tool to depth has been completed, that is, after the follower 27 has passed out of the oblique portion of the cam slot 87, the cam block 62 carried by the feed bar 46 engages the shoulder 56 on the dog 55 which is held in normal position by the guide bar 58 and thus a connection is completed between the feed bar 46 and the carriage 14. Continued movement of the fed bar 46 thus causes the carriage to be moved through an approach stroke. As a result of this movement of the carriage 14 longitudinally of the lathe, the tool is first approached to the work and then is fed across the work at a constant depth, for the cam follower 27 is now riding upon the edge of the cam bar 30. Such movement of the tool longitudinally of the lathe at a constant depth is represented by the line A of the diagram of Fig. 7. The length of the line A, that is, the extent of longitudinal movement of the carriage 14 is determined by adjustment of the guide bar 58, for movement of the carriage with the feed bar 48 continues until the dog 55 reaches the reduced portion 64 of the guide bar 58 whence it is permitted to pivot out of the path of the cam block 62 and thus free the cariage from the feed bar 46. During the latter portion of the longitudinal movement of the tool and the carrage, that is, during the portion of the diagram represented by G, there is a gradual slowing up of the carriage movement as the dog 55 slowly drops onto the reduced portion of the guide bar 58, the carriage coming to rest when the dog 55 is completely disengaged from the cam block 62.

With the disengagement of the dog 55 and the cam block 62, the carriage 14 comes to rest but the feed bar 46 and the cam bar 30 continue to move for a predetermined distance prior to reversal of the pinion 45. As an incident to such additional movement of the cam bar 30 the dog 89 strikes and shifts the bar 32 of the tool relief mechanism, permitting the tool to be relieved, which movement is represented by the line E of Fig. 7.

After the tool has been relieved, the pinion 45 is reversed, with the result that the feed bar 46 is now driven to the right in Fig. 1, while the cam bar 30 is driven to the left in Figs. 1 and 2. Here again the cam bar 30 is immediately actuated while the carriage 14 remains stationary until the nuts 67 on the rod 65 engage the bracket 66 and thereafter cause the carriage to return with the feed bar 48. It will be apparent from a consideration of Fig. 1 that during the forward movement of the feed bar 46 the nuts 67 will have become spaced from the bracket 66 a distance corresponding to the distance that the feed bar must travel before the cam block 62 engages the dog 55 plus the distance that the feed bar travels after the dog 55 and the cam block 62 have been disengaged. Since the carriage and the cross slide reach their initial positions simultaneously, the path of the cross slide and hence the tool carried thereby differs from the path during the approach movement and is composed of a longitudinal movement represented by the line H and an oblique movement represented by the line J. The oblique movement results from the simultaneous longitudinal movement imparted by the carriage, and the withdrawal movement imparted to the cross slide by the cam bar 30, for during that portion of the movement the cam follower 27 again rides in the oblique portion of the cam slot 81. Simultaneously with the return of the carriage to initial position the stop 92 abuts and shifts the bar 32 of the tool relief mechanism to reset the same, thereby imparting to the tool the movement represented by the line F on Fig. 7.

In order that reversal of the pinion 45 may not result in a continued forward movement of the carriage 14, because of frictional engagement between the cross slide 15 and the cam bar 30 which upon such reversal of the pinion 45 is shifted to the left as viewed in Fig. 2, the nuts 100 carried on the rod 96 are so adjusted that they will strike the sleeve 99 substantially simultaneously with the disengagement of the dog 55 from the cam block 62. Thus the carriage 14 will then be yieldably retained against continued forward movement.

The cycle disclosed has been described primarily with respect to the direction of movement of a tool carried by the cross slide 15 as distinguished from the rate of movement of the tool. It is to be understood, however, that, of course, because the pinion 45 is capable of rotation at both feed and traverse rates, the desired and appropriate rates of movement may be imparted to the tool. Normally the feed of the tool to depth is at a traverse rate and usually a portion of the longitudinal feed of the tool also is at a traverse rate, though the movement represented by the line A may be either at a feed or at a traverse rate, or at a combination of the two, as desired. The return movement usually is at a traverse rate.

It is believed apparent from the foregoing that a unique cycle of tool movement has been devised, which cycle is usually flexible since the drive for the carriage and the cross slide are independent. While but a single cycle has here been described, it is to be understood, of course, that the cycle is but exemplary of numerous other cycles which may be obtained with the unique construction provided herein. These different cycles may be obtained with the standard cam bar 30 disclosed herein by variation of the adjustments provided, and still different cycles may be obtained by employing a specially designed cam bar 30. More specifically, the cycle of movement may be varied by adjustment of the cylinder 70 on the rod 72, which would change the relationship between the feed bar 46 and the cam bar 30, or by varying the position of the cam block 62, which would determine the extent of movement of the feed bar 46 prior to engagement with the dog 55, or by adjustment of the guide bar 58, which would determine the time at which the dog 55 became disengaged from the cam block 62. It is believed that the various cycles that may be obtained by these variations and the adjustments necessary to obtain the desired cycles will be readily apparent to those skilled in the art, and that it is not necessary to describe the cycles and the adjustments in detail.

Similarly, it is believed that it will be readily apparent to those skilled in the art how the cycles might be varied by employing cam bars 30 of a particular configuration. For example, that the cam bar 30 might be provided with a cam surface 30$^a$, shown in dotted outline in Fig. 2, which would function after the carriage has been released from the feed bar 46 to feed the tool carried by the cross slide 15 further into the work, as represented by the dotted line C of Fig. 7.

The cycle of operation of the modified form of the invention shown in Fig. 6 is represented diagrammatically in Fig. 8. This cycle differs somewhat from the cycle of the preferred form of the invention shown in Fig. 7 in that there is no independent feed-in movement of the cross slide prior to movement of the carriage. In the form of the invention shown in Fig. 6, the cam block 62' is in engagement with the dog 55' at the beginning of forward movement of the feed bar 46', and thus the carriage 14' will immediately be given a longitudinal movement. For purposes of consideration of the cycle of movement, let it be assumed also that the cam bar 30' is so adjusted that the follower of the cross slide 15 is positioned in the longitudinal portion of the cam slot (see Fig. 2) when the carriage is in its initial position. With the cam follower of the cross slide in the longitudinal portion of the cam slot in the cam bar 30', longitudinal movement of the carriage 14' will impart a corresponding longitudinal movement to the cross slide and to the tool carried thereby, which movement is represented by the line K in Fig. 8. As the longitudinal movement of the carriage continues and the cam follower reaches the oblique portion of the cam slot in the cam bar 30', the cross slide will also be moved transversely of the carriage and lathe so as to feed the tool carried thereby into depth. Such movement is represented by the line B' of Fig. 8. With the cam follower out of the oblique portion of the cam slot and riding on the edge of the cam bar 30', continued forward movement of the carriage 14 will result in a longitudinal movement of the tool past the work, which movement is represented by the line A'.

Just as in the case of the preferred form of the invention, the latter portion of the movement A' includes a slowing up of the carriage movement as the dog 55' drops slowly onto the reduced portion 64' of the guide bar 58'. This movement is represented by the line G'. Simultaneously with the disengagement of the dog 55' with the cam block 62', dog 89' engages the tool relief mechanism to shift the same and effect relief of the tool. This movement is represented by the line E' of Fig. 8. After such relieving of the tool and disengagement of the carriage from the feed bar 48', the pinion 45' is reversed to initiate a return movement of the carriage and cross slide. Herein the path of movement is identical with the path of the approach movement, except that it is displaced therefrom by a distance corresponding to the extent of tool relief. With the return of the carriage and the cross slide to initial position, a dog 106 engages the tool relief mechanism to reset the same and to reset the tool, which movement is represented by the line F" of Fig. 8.

As was stated in connection with the preferred form of the invention, while but a single cycle has here been described for the modified form of the invention, it is to be understood, of course, that the cycle is but exemplary of numerous other cycles which may be obtained with the unique construction provided herein. These different cycles may be obtained either with the standard cam bar 30' disclosed herein by variation of the adjustments provided, or still different cycles may be obtained by employing a specially designed cam bar 30'. It is believed that, in view of the foregoing description, the various cycles that may be obtained by these variations and the adjustments necessary to obtain the desired cycles will be readily apparent to those skilled in the art, and that it is not necessary to describe in detail all of the cycles that can be obtained and the adjustments necessary to obtain the same.

As mentioned hereinbefore, the construction illustrated in the drawings provides for a brief period of slowing down of the carriage just before the carriage stops. This period of slowing down is determined by the shape of the lip 57 of the dog or by the shape of said lip and also the shoulder formed by the reduced portion 64 of the guide bar 58. If no slowing down of the carriage is desired, the lip 57 of the dog and the shoulder on the guide bar may be provided with relatively sharp corners. By rounding the corner 57ª of the dog, as illustrated in Fig. 9, a definite period of slowing down is obtained. Thus the carriage begins to slow down as the rounded corner of the dog moves over the shoulder formed by the reduced portion 64 of the guide bar, the slowing down movement of the carriage continuing until the shoulder 56 on the upper edge of the dog slides over the cam block 62.

It will be readily apparent that the period of slowing down may be varied by varying the radius of the corner 57ª of the dog or by providing other shapes on this same corner of the dog or on the guide bar.

We claim as our invention:

1. In a machine tool having a bed, a carriage slidably mounted on the bed for reciprocation longitudinally thereof, a cross slide mounted on said carriage for reciprocation transversely thereof and of the bed, a common driving member for said cross slide and said carriage, driving connections between said driving member and said carriage and said cross slide operable during the initial movement of said driving member to feed said cross slide transversely of said carriage while said carriage remains stationary and operable after a predetermined movement of said driving member to actuate said carriage, and means operable after a predetermined movement of said carriage again to disengage the driving connection between said driving member and said carriage permitting said carriage to come to rest while the movement of said driving member continues.

2. In a machine tool having a bed, a carriage slidably mounted on the bed for reciprocation longitudinally thereof, a cross slide mounted on said carriage for reciprocation transversely thereof and of the bed, a reversible driving member common to said cross slide and said carriage, a driving connection between said driving member and said cross slide, a driving connection between said driving member and said carriage including a disengageable means, the driving connection between said driving member and said cross slide being operable during the initial forward movement of said driving member to feed said cross slide transversely of said carriage, the disengageable means of the driving connection between said driving member and said carriage being disengaged during the initial movement of said driving member whereby said carriage remains stationary and becoming engaged during continued forward movement of said driving member to move said carriage forwardly with said driving member, means operable automatically after a predetermined forward movement of said carriage again to disengage said disengageable means, and means operable upon reverse movement of said driving member to engage said carriage and return the same to initial position.

3. The combination with a movable carriage and a cross slide mounted thereon of a common driving member therefor, and an independent driving connection between said driving member and each said carriage and said cross slide, each driving connection being operable independently of the condition of the other connection.

4. In a machine tool having a bed, a carriage reciprocably mounted on the bed, a cross slide slidably mounted on said carriage, a common driving member, an independent driving connection from said driving member to said carriage including disengageable means for disconnecting said carriage from said driving member, and an independent driving connection directly from said driving member to said cross slide operable independently of the condition of the disengageable means in the driving connection to said carriage.

5. In a machine tool having a bed, a carriage slidably mounted on the bed for reciprocation longitudinally thereof, a cross slide mounted on said carriage for reciprocation transversely thereof and of the bed, a cam follower carried by said cross slide, a reversible driving member common to said cross slide and said carriage, a driving mechanism from said driving member to said cross slide including a cam bar engaged by said cam follower and having a permanent connection with said driving member, and a driving connection between said driving member and said carriage including a disengageable means, said disengageable means at the beginning and end of the forward movement of said driving member being disengaged permitting said carriage to remain stationary while said driving member and said cam bar continue their movements for independent actuation of said cross slide.

6. In a machine tool having a bed, a carriage slidably mounted on the bed for reciprocation longitudinally thereof, a cross slide mounted on said carriage for reciprocation transversely thereof and of the bed, a reversible driving member, a feed bar slidably guided in said carriage for reciprocation relative thereto and engaged by said driving member to be reciprocated thereby, an operative connection between said feed bar and said cross slide functioning upon forward movement of said feed bar to advance said cross slide transversely of said carriage and upon return movement of said feed bar to retract said cross slide, an operative connection between said feed bar and said carriage including a disengageable means, said disengageable means during predetermined portions of the forward movement of said feed bar being automatically engaged to cause a corresponding forward movement of said carriage, and means providing a driving connection between said feed bar and said carriage during return movement of said feed bar to effect return movement of said carriage.

7. In a machine tool having a bed, a carriage slidably mounted on the bed for reciprocation longitudinally thereof, a cross slide mounted on said carriage for reciprocation transversely thereof and of the bed, a cam follower carried by said cross slide, a common power source for actuating said carriage and cross slide terminating in a pinion capable of a rotation in forward and reverse directions and at transverse and feed rates, a feed bar slidably mounted in said carriage for movement relative thereto and engaging said pinion to be driven therefrom in a forward and a return movement, an operative connection between said feed bar and said cross slide including a cam bar engaged by the follower on said cross slide and permanently connected with said feed bar to be reciprocated as said feed bar is reciprocated, said cam bar being designed to effect an advance movement of said cross slide transversely of said carriage during the initial forward movement of said feed bar, a driving connection between said feed bar and said carriage comprising an element secured to said feed bar, a pivotally mounted dog on said carriage adapted in normal position to be disposed in the path of the element secured to said feed bar during the forward movement thereof to impart the movement of said feed bar to said carriage, and a stationarily mounted guide bar for supporting said dog in the path of the element on said feed bar to obtain a predetermined movement of said carriage with said feed bar, and means secured to said feed bar operating upon the return movement thereof to engage said carriage to effect return of the carriage to initial position.

8. In a machine tool having a bed, a carriage reciprocably mounted on the bed, a cross slide slidably mounted on said carriage, a driving member, a disengageable driving connection between said member and said carriage, a cam mounted independently of said carriage and said cross slide and distinct from said driving member, a follower carried by said cross slide and engaging said cam to actuate said cross slide upon relative movement between said cross slide and said cam, and means driven from said driving member for producing relative movement between said cross slide and said cam.

9. In a machine tool having a bed, a carriage reciprocably mounted on the bed for movement longitudinally thereof, a cross slide slidably mounted on said carriage for movement transversely thereof and of the bed, a cam bar extending longitudinally of the bed and mounted independently of said carriage and said cross slide, a follower carried by said cross slide and engaging said cam bar to actuate said cross slide transversely of the bed upon relative longitudinal movement of said cross slide and cam bar, and means for actuating said carriage and for producing relative longitudinal movement between said cam bar and said cross slide including a disengageable driving connection between said driving member and said carriage.

10. In a machine tool having a bed, a carriage reciprocably mounted on the bed for movement longitudinally thereof, a cross slide slidably mounted on said carriage for movement transversely thereof and of the bed, a cam bar extending longitudinally of the bed, a follower carried by said cross slide and engaging said cam bar to actuate said cross slide transversely of said carriage upon relative longitudinal movement of said cross slide and cam bar, a power source terminating in a rotatable pinion, a feed bar slidably mounted in said carriage for movement longitudinally thereof and engaging said pinion to be driven therefrom, and means for actuating said carriage on a forward stroke and for producing relative longitudinal movement between said cam bar and said cross slide including a disengageable driving connection between said feed bar and said carriage permitting relative movement between said feed bar and said carriage while the driving connection is disengaged.

11. In a machine tool, the combination with a reciprocable carriage, of a reciprocatory driving member mounted for movement relative to the carriage, means operable after a predetermined forward movement of said member to connect said member to the carriage to effect forward movement thereof, and means operable after a predetermined joint movement of said member and the carriage to disconnect said member from the carriage.

12. In a machine tool, the combination with a reciprocable carriage, of a reciprocatory driving member mounted for movement relative to the carriage, means operable after a predetermined forward movement of said member to connect said member to the carriage to effect forward movement thereof, and means operable after a predetermined joint movement of said member and the carriage to disconnect said member from the carriage and to slow down the carriage prior to the stopping thereof.

13. In a machine tool, a carriage mounted for reciprocatory movement, a reciprocatory driving member mounted for movement relative to said carriage, means including an element secured to said carriage and adapted to be disposed in the path of a portion of said member providing a connection between said driving member and said carriage whereby said carriage is actuated forwardly by forward movement of said member, and means including a guiding member for said element operating to disrupt the connection between said member and said carriage to permit continued forward movement of said member independently of said carriage.

14. In a machine tool having a bed, a carriage mounted for reciprocatory movement on the bed, a reciprocatory driving member mounted for movement relative to said carriage, and a driving connection between said driving member and said carriage comprising a pivotally mounted dog adapted in normal position to be disposed in the path of a portion of said driving member during the forward movement thereof to be engaged by the portion of said member and providing a connection between said driving member and said carriage whereby said carriage is actuated forwardly, a guide bar disposed beneath said dog along which said dog is adapted to slide during the forward movement of said carriage to be retained thereby in normal position in the path of the portion of said feed bar, said guide bar having a reduced portion permitting said dog to pivot out of the path of said feed bar to effect disengagement of the carriage from said feed bar, the end of said guide bar and the dog having engaging portions formed to provide a slowing down of the movement of the carriage just prior to the stopping thereof.

15. In a machine tool having a bed, a carriage mounted for reciprocatory movement on the bed, a reciprocatory driving member mounted for movement relative to said carriage, a driving connection between said driving member and said carriage for effecting a forward movement of said carriage comprising a cam block adjustably secured to said driving member, a pivotally mounted dog secured to said carriage and in normal position being disposed in the path of said cam block to be engaged thereby during the forward movement of said driving member to complete a driving connection to said carriage, and a guide bar disposed beneath said dog and providing a surface along which said dog slides and by which said dog is retained in the path of said cam block, said dog upon reaching the end of the surface of said guide bar pivoting out of the path of said cam block to disengage said carriage from said driving member and said guide bar being adjustably fixed to vary the point of disengagement of said dog and cam block, and adjustable means secured to said driving member operating during the return movement of said member and independently of said first mentioned driving connection to effect return movement of said carriage.

16. In a machine tool having a bed, a carriage slidably mounted on the bed, a cross slide slidably mounted on the carriage, a driving member for said carriage and cross slide, and mechanism operatively connected between said driving member and said cross slide to effect movement thereof relative to said carriage comprising a cam follower supported on said cross slide, a cam bar engaged by said follower and mounted for reciprocatory movement relative to said cross slide and said driving member, and a connection between said driving member and said cam bar for effecting reciprocation of said cam bar.

17. In a machine tool having a bed, a carriage slidably mounted on the bed, a cross slide slidably mounted on the carriage, a driving member for said carriage and cross slide, and mechanism operatively connected between said driving member and said cross slide to effect movement thereof relative to said carriage comprising a cam follower supported on said cross slide, a cam bar engaged by said follower and mounted for reciprocatory movement relative to said cross slide, and a connection between said driving member and said cam bar for effecting reciprocation of said cam bar, said connection being adjustable to vary the relative positions of said driving member and said cam bar.

18. In a machine tool having a bed, a carriage slidably mounted for reciprocation longitudinally of the bed, a cross slide mounted on said carriage for reciprocation transversely thereof, means for reciprocating said cross slide transversely of said carriage comprising a cam follower carried on the cross slide, and a cam bar with which said follower is engaged fixedly mounted on the bed, and means for reciprocating said carriage including a disengageable connection.

BENGT R. GRANBERG.
ALFRED G. ERICSON.